US007171368B1

(12) United States Patent
Sisson et al.

(10) Patent No.: US 7,171,368 B1
(45) Date of Patent: Jan. 30, 2007

(54) METHOD AND APPARATUS FOR THE REMOTE INSPECTION OF POSTAGE METERS

(75) Inventors: Robert W. Sisson, Shelton, CT (US); Steven J. Pauly, New Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 852 days.

(21) Appl. No.: 09/220,830

(22) Filed: Dec. 24, 1998

(51) Int. Cl.
*G06Q 99/00* (2006.01)
*G06F 17/00* (2006.01)

(52) U.S. Cl. .......................................... 705/1; 705/408

(58) Field of Classification Search .................... 705/1, 705/60, 402, 50, 401, 410, 404, 408, 62, 705/403; 380/51, 55, 2; 235/375
See application file for complete search history.

(56) References Cited

U.S. PATENT DOCUMENTS 4,812,965 A * 3/1989 Taylor et al. ............... 705/401
5,731,980 A * 3/1998 Dolan et al. ................ 705/410
5,799,093 A * 8/1998 French et al. ................ 380/51
5,812,400 A * 9/1998 Eddy et al. ................. 705/410
5,943,658 A * 8/1999 Gravell et al. .............. 705/410
6,050,486 A * 4/2000 French et al. ............... 235/101

FOREIGN PATENT DOCUMENTS

GB 2 213 302 * 8/1989

OTHER PUBLICATIONS

No author'; Pitney Bowes, USPS Join to Stamp Out Postal Meter Fraud; May 15, 1995; Printing News East; 1 page.*

* cited by examiner

*Primary Examiner*—Thomas A. Dixon
(74) *Attorney, Agent, or Firm*—Steven J. Shapiro; Angelo N. Chaclas; George M. Macdonald

(57) ABSTRACT

A method comprising the steps of generating a code at a data center, the code being associated with the value dispensing system; creating a challenge card having the code therein; sending the challenge card via a carrier service to the specific location; retrieving the code from the challenge card and entering the code into the value dispensing system subsequent to receipt of the code at the specific location; communicating the code retrieved from the challenge card from the value dispensing system to the data center; and comparing the code received at the data center from the value dispensing system to the code generated at the data center to verify that the value dispensing system is physically located at the specific location.

9 Claims, 3 Drawing Sheets

METHOD AND APPARATUS FOR THE REMOTE INSPECTION OF POSTAGE METERS

FIELD OF THE INVENTION

The instant invention relates to the inspection of metering systems and, more particularly, to a cryptographically secure method of inspecting metering systems.

BACKGROUND OF THE INVENTION

The United States Postal Service (USPS) is currently advocating the implementation of a new Information-Based Indicia Program (IBIP) in connection with the printing of postage indicium by postage metering systems. Under this new program, each postage indicium that is printed will include cryptographically secured information in a barcode format together with human readable information such as the postage amount and the date of submission to the post office. The cryptographically secured information is generated using public key cryptography and allows a verification authority, such as the post office, to verify the authenticity of the printed postage indicium based on the information printed in the indicium and the printed destination address.

In connection with the introduction of the cryptographically secure postage metering systems, the USPS is requiring that a remote inspection of these systems be implemented to verify 1) the location of the metering system, 2) the integrity of the cryptographically secured indicium, and 3) the integrity of the ascending and descending accounting register values. In at least one scenario, the USPS has suggested that in order to verify the location of the postage metering system the use of an indicium card is acceptable. The indicium card is sent by either the USPS or the metering system manufacturer (sender) to the registered address of the postage metering system. Upon receipt of the indicium card, the registered user of the metering system prints a zero dollar value indicia and returns the indicium card to the sender. The sender can then perform the standard cryptographic verification of the indicium to verify that it was printed by the appropriate metering system. If the verification is successfully completed, the sender assumes that the metering system is physically located at the address to which the inspection card was sent. The problem with this system is that a duplicate indicium card can be created and a valid indicium printed thereon even if the metering system is not located at its registered location. Moreover, the return of the indicium card is a manual process that is inefficient and prone to human error.

Thus, what is needed is a more secure method of verifying the location of a postage metering system. Additionally, it would be desirable that the more secure method be more fully automated than the system described above.

SUMMARY OF THE INVENTION

It is an object of the invention to provide a method that securely verifies the location of a value dispensing system. This object is met by a method comprising the steps of generating a code at a data center, the code being associated with the value dispensing system; creating a challenge card having the code therein; sending the challenge card via a carrier service to the specific location; retrieving the code from the challenge card and entering the code into the value dispensing system subsequent to receipt of the code at the specific location; communicating the code retrieved from the challenge card from the value dispensing system to the data center; and comparing the code received at the data center from the value dispensing system to the code generated at the data center to verify that the value dispensing system is physically located at the specific location.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
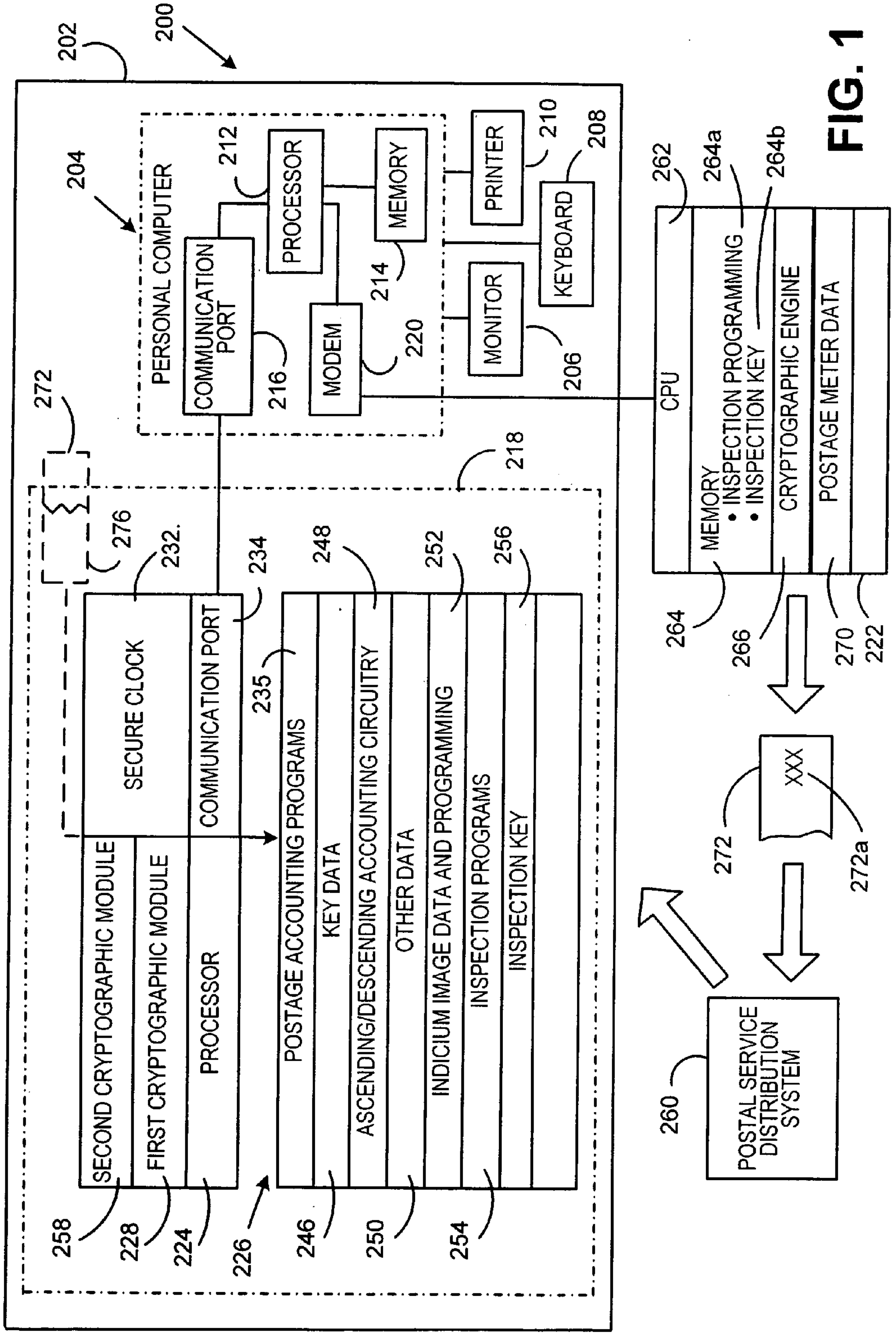
FIG. 1 is a schematic view of the inventive postage metering inspection system.

Referring to FIG. 1, a postage metering remote inspection system is shown at 200, Inspection system 200 includes a postage metering system, shown generally at 202 (in enlarged detail), having a personal computer 204 connected to a monitor 206, a keyboard 208, and a printer 210. The personal computer 204 additionally includes a processing subsystem 212 having an associated memory 214. The processing subsystem 212 is connected to a communications port 216 for communication with a secure postage meter accounting subsystem 218 and a modem 220 for communicating with a remote facility or data center 222. It should be recognized that many variations in the organization and structure of the personal computer 204 as well as the secure postage metering accounting subsystem 218 could be implemented. As an example, the communications from the modem 220 to the remote facility 222 can be by way of hardwire, radio frequency, or other communications including the Internet. The postage metering accounting subsystem 218 may take many forms such as, for example, a secure vault type system, or a secure smart card system.

The postage metering accounting subsystem 218 includes a processor 224 coupled to a memory 226. The processor 224 has associated with it a first cryptographic module 228, a secure clock 232 and a communications port 234. The memory 226 may have stored within it different data as well as the operating programs 235 for the postage metering accounting subsystem 218. The data shown as stored in memory 226 includes cryptographic key data 246, conventional postage accounting ascending/descending register circuitry 248 which accounts for the amount of postage dispensed, other data 250 which may be printed as part of the postage indicium (such as an algorithm identifier, customer identifier, and software identifier), indicium image data and associated programming 252 used to build the postage indicium image, the inventive inspection programming 254 discussed in more detail below, and a secret inspection key 256. The accounting circuitry 248 can be conventional accounting circuitry which has the added benefit of being capable of being recharged with additional prepaid postage funds via communication with a remote data center. Additionally, a second inspection cryptographic module is shown at 258. This cryptographic module 258 can be a physically separate device from the cryptographic module 228 or separate hardware in the same device, or a colocated cryptographic software program The final component of the inspection system 200 is a postal distribution network identified at 260.

Figure 2:
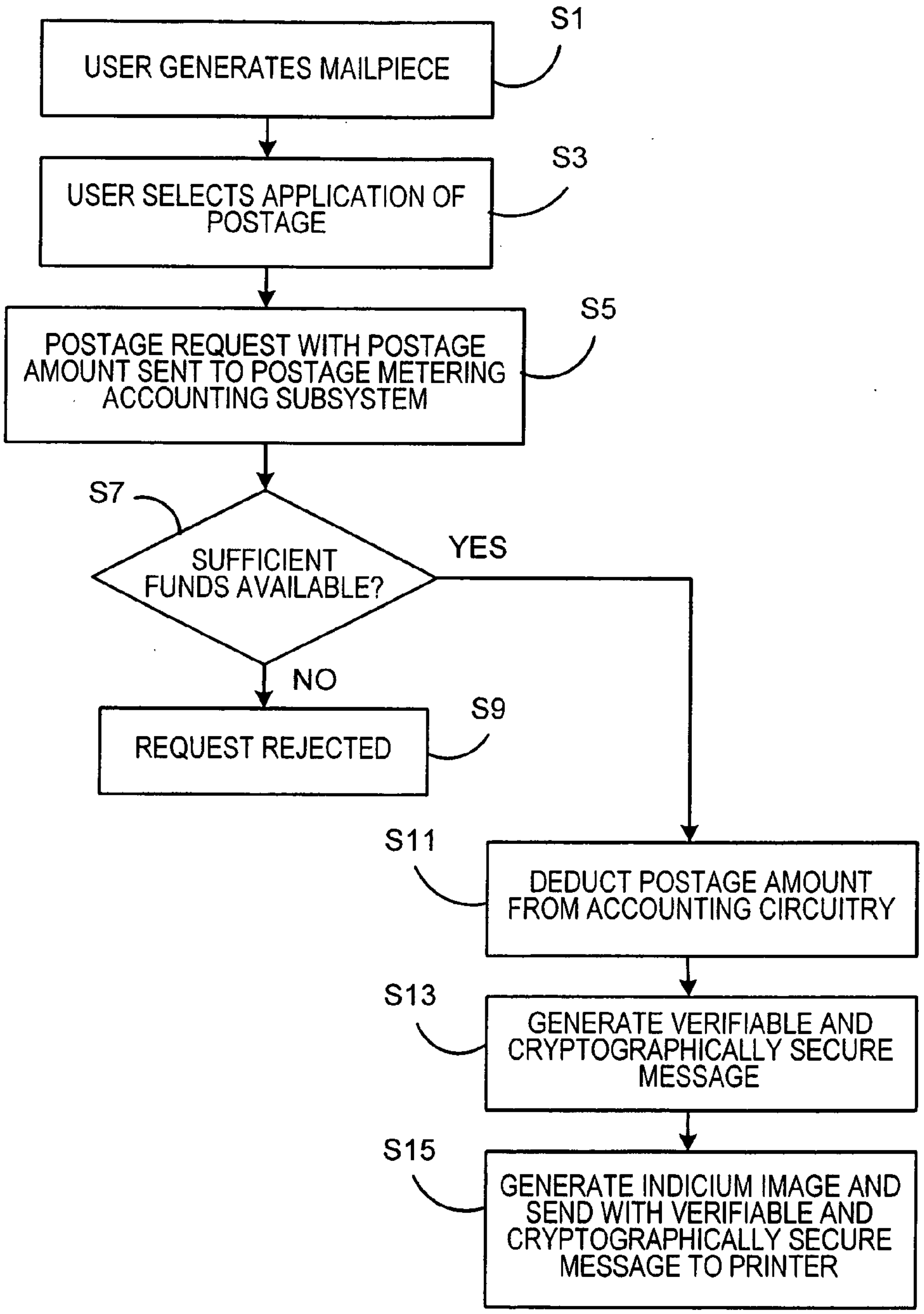
FIG. 2 is a flowchart showing the generation of a postage indicium within the postage metering system of FIG. 1.

Referring to FIGS. 1 and 2, the operation of the postage metering system 202 in generating and printing a known cryptographically secure postage indicium on a mailpiece will be explained. At step S1, a user generates a mailpiece utilizing an application program stored in memory 214. Upon completion of the mailpiece the user can elect to have postage applied thereto by clicking on an icon appearing on monitor 206 or alternatively pressing a special function key of keyboard 208 (step S3). In either case, once the postage application option has been elected, the personal computer 204 sends such request together with the requested postage amount to the postage metering accounting subsystem 218 via the communication ports 216 and 234 (step S5) At step S7, the postage metering subsystem 218 determines if sufficient funds are available in the accounting circuitry 248 to pay for the requested postage. If the answer at step S7 is "NO" the request is rejected and the user is notified of such rejection via the monitor 206 (step S9). On the other hand, if the answer at step S7 is "YES" the amount of the postage to be dispensed is deducted within the accounting circuitry 248 (step S11). At step S13 the first cryptographic module 228 utilizes the key data 246 to create a verifiable and cryptographically secure message which will be included as part of the printed postage indicium. The generation of the secure message can be accomplished in a known manner using either public key cryptography or secret key cryptography. The first cryptographic module 228 and the key data 246 would be conventionally configured to accommodate the selected secret or public key cryptographic system. At step S15 the indicium image is then generated using the indicium image data and program 252 and the indicium image including the verifiable and cryptographically secure message are sent via the computer 204 to the printer 210 for printing on a mailpiece such as an envelope. The above description relative to the generation of the postage indicium with the cryptographic message and operation of the postage metering system is known such that a further detailed discussion is not considered warranted.

Figure 3:
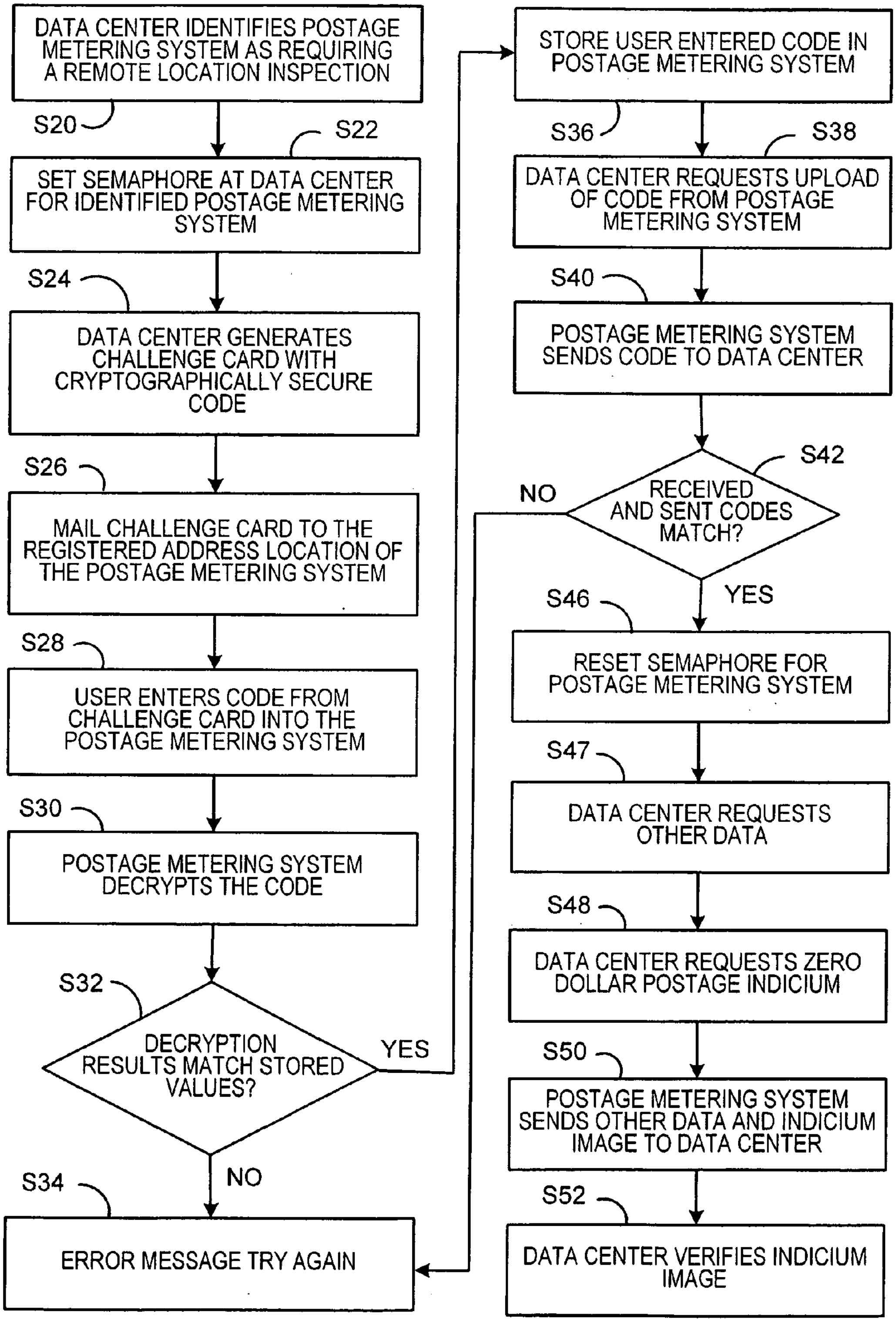
FIG. 3 is a flowchart of the process for a location inspection of the postage metering system.

Referring to FIGS. 1 and 3, the operation of the postage metering inspection system in securely determining the location of the postage metering system 202 will be described. The data center 222, which can be either the USPS or the postage metering system 202 vendor, includes a central processing unit 262 for performing the functions set forth below, memory 264 having stored therein the inspection programming 264*a* and the secret inspection key 264*b*, a cryptographic engine 266 which is the same as the second cryptographic engine 258 in accounting module 218, and stored postage meter data 270. The postage meter data 270 includes data associated with each postage metering system 202 such as it serial number, registered address location, next inspection date, ascending and descending register information, a flag which can be set to identify that a postage metering system 202 location inspection is due, and any other data required by the postal service. In operation, the data center utilizes CPU 262 and inspection program 264*a* to evaluate the postage meter data 270 to identify when a postage metering system 202 requires a remote meter location inspection (step S20). Upon determination of the required location inspection, a flag is set at the data center 222 to identify that at the next contact between the identified postage metering system 202 and the data center 222 the location inspection must take place (step S22). The data center 222 then generates a challenge card 272 which has a code 272*a* printed thereon (step S24). The specific code 272*a* is associated with the postage metering system serial number at the data center 222 and in the preferred embodiment the code 272*a* is an encrypted code. For example, the code 272*a* can be a message authentication code which is generated by applying via the cryptographic engine 266 an encryption algorithm such as DES to the postage metering system 202 serial number, the required inspection date, and the secret inspection key 264*b*.

The challenge card 272 is then mailed in a normal manner to the registered (licensed) postage metering system 202 address via the postal service distribution system 260 (step S26). Upon receipt of the challenge card 272, the user can manually enter the code 272*a* into the postage metering system 202 for its storage in memory 226 and future use as is described below (step S28). The inspection program 254 allows such entry to be made, such as for example, through the selection of a predesignated key on keyboard 208. In a preferred embodiment, upon entry of code 272*a*, the postage metering system utilizes the second cryptographic module 258 and the inspection key 256 (which is the same as key 264*b*) to decrypt the user entered message authentication code 272*a* (step S30). At step S32, the postage metering system 202 compares the results of the decryption process to determine if the postage metering serial number and inspection date which it has stored within memory 226 matches the decrypted values. If the answer is "NO", the user is advised via the monitor 206 that an incorrect code has been entered and requests the user to try again (step S34). However, if the answer at step 32 is "YES", the user entered code 272*a* is stored within memory 226 (step S36) for use at the next communication between the postage metering system 202 and the data center 222. The above code authentication procedure precludes the situation where a user inadvertently enters a wrong code and loses the challenge card 272. In this situation, at the time of the inspection process described below, the improperly stored code will not permit postage metering system 202 location verification and the user will not be able to reenter the proper code since the challenge card has been lost.

Subsequent to step S36 at the next communication between the data center 222 and the postage metering system 202, whether for a postage funds refill or any other required inspection, the data center 222 determines that the flag for the particular postage metering system 202 has been set and will request that the stored code 272*a* be uploaded from the postage metering system 202 to the data center (step S38). In response to the data center request, the postage metering system 202 sends the code 272*a* to the data center 222 (step S40). At step S42 the data center 222 compares the received code 272*a* to that which was sent to the postage metering system 202 on the challenge card 272. If the codes do not match, the data center 222 advises the user of the error via a message displayed on monitor 206 (step S34). On the other hand, if the codes match the data center 222 resets the flag to acknowledge successful completion of the location inspection and verification of the postage metering system 202 location (step S46). Subsequent to this action, the data center 222 can then request other conventional inspection data to be sent from the postage metering system 202 to the data center 222; such as the current ascending/descending register values (step S47). Moreover, in order to ensure that the postage metering system 202 is correctly producing an indicium, the data center 222 can request that the user perform a zero dollar postage action (step S48). Thus, when the user performs the zero dollar postage action, instead of a zero dollar indicium being printed, it is electronically sent to the data center 222 via modem 220 together with the other inspection data (step S50). The data center 222 can then perform a conventional indicium verification based on the electronic indicium image in the same manner that a printed indicium is verified except that no scanning of a printed image is required (step S52).

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims. For example, the challenge card 272 could be a smart card, floppy disk, or CD-ROM which has the code 272*a* stored thereon. In this configuration the accounting subsystem 218 (or the computer 204) can have a corresponding card reader 276 therein which could automatically read the code 272*a*. This would preclude the incorrect entry of code 272*a* by a user. Additionally, while the cryptographically secure code 272*a* was discussed in connection with a secret key system, a public key system could be used to sign the code 272*a* in lieu thereof. Furthermore, upon receipt of the code 272*a*, it does not necessarily have to be immediately entered and stored in the postage metering system 202 but can be entered at the request of the data center during communication with the postage metering system 202 for a postage refill or a required inspection. Furthermore, the verification at the postage metering system 202 of the code 272*a* is not required, and while the invention has been described in connection with a postage metering system 202 it is applicable to any metering or value dispensing system and for carrier services other than the post. Finally, while at step 30 decryption is used for verification, alternatively the second cryptographic module can encrypt the data itself and compare it to the received encrypted data to determine if a match exists which would complete the verification process.

What is claimed is:

1. A method for verifying that a postage metering system is located at a specific location, the method comprising the steps of:

generating a code at a data center, the code being associated with the postage metering system;

creating a challenge card having the code therein;

sending the challenge card via a carrier service to the specific location;

retrieving the code from the challenge card and entering the code into the postage metering system subsequent to receipt of the code at the specific location;

communicating the code retrieved from the challenge card from the postage metering system to the data center; and comparing the code received at the data center from the postage metering system to the code generated at the data center to verify that the postage metering system is physically located at the specific location.

2. A method as recited in claim 1, wherein the code generated at the data center is cryptographically secured.

3. A method as recited in claim 2, wherein the code is cryptographically secured using secret key cryptography.

4. A method as recited in claim 3, wherein upon the entering of the code retrieved from the challenge card into the postage metering system the postage metering system decrypts the code retrieved from the challenge card to verify its authenticity.

5. A method as recited in claim 1, wherein the challenge card is a printed card.

6. A method as recited in claim 1, wherein the challenge card is one of a smart card, a floppy diskette, or a CD-ROM.

7. A method as recited in claim 6, wherein the code is electronically retrieved from the challenge card and electronically entered into the postage metering system.

8. A metering system comprising:

means for accounting for value dispensed by the metering system;

a challenge card having a code therein associated with an identification of the accounting means, the challenge card received from a carrier service;

means for entering the code obtained from the challenge card into the accounting means; and means for communicating the entered code from the accounting means to a remote data for use in verifying the location of the accounting means.

9. A method for verifying that a value dispensing system is located at a specific location, the method comprising the steps of:

generating a code at a data center, the code being associated with the value dispensing system;

creating a challenge card having the code therein;

sending the challenge card via a carrier service to the specific location;

retrieving the code from the challenge card and entering the code into the value dispensing system subsequent to receipt of the code at the specific location;

communicating the code retrieved from the challenge card from the value dispensing system to the data center; and comparing the code received at the data center from the value dispensing system to the code generated at the data center to verify that the value dispensing system is physically located at the specific location.

* * * * *